Feb. 9, 1971　　R. MAYER ET AL　　3,561,275
DRIVE MEANS FOR TUNERS
Filed Feb. 12, 1969　　3 Sheets-Sheet 1

INVENTORS
RUDOLF MAYER AND HELMUT STORZ

BY Craig, Antonelli, Stewart & Hill
ATTORNEYS

INVENTORS
RUDOLF MAYER AND HELMUT STORZ

BY Craig, Antonelli, Stewart & Hill

ATTORNEYS

Feb. 9, 1971   R. MAYER ET AL   3,561,275
DRIVE MEANS FOR TUNERS
Filed Feb. 12, 1969   3 Sheets-Sheet 3

INVENTORS
RUDOLF MAYER AND HELMUT STORZ

BY Craig, Antonelli, Stewart & Hill
ATTORNEYS 3,561,275
DRIVE MEANS FOR TUNERS
Rudolf Mayer and Helmut Storz, Rottweil, Germany, assignors to Messrs. R. & E. Hopt KG
Filed Feb. 12, 1969, Ser. No. 798,581
Claims priority, application Germany, Dec. 27, 1968,
P 18 17 261.7
Int. Cl. F16h 35/18
U.S. Cl. 74—10.6                                    20 Claims

ABSTRACT OF THE DISCLOSURE

A drive means for tuners, especially tuners for television sets, having a drum supported in a housing so as to permit it to be rotated about its longitudinal center line. The drum is provided with a plurality of running nuts spaced along its circumference and arranged in a manner enabling them to be adjusted in the longitudinal direction of the drum. The running nuts are selectively brought into engagement with a scanner member operatively connected to tuning elements of the tuner by rotating the drum. Control cams ensure the transition of the scanning member from one running nut to another when the drum is rotated.

---

Figure 1:
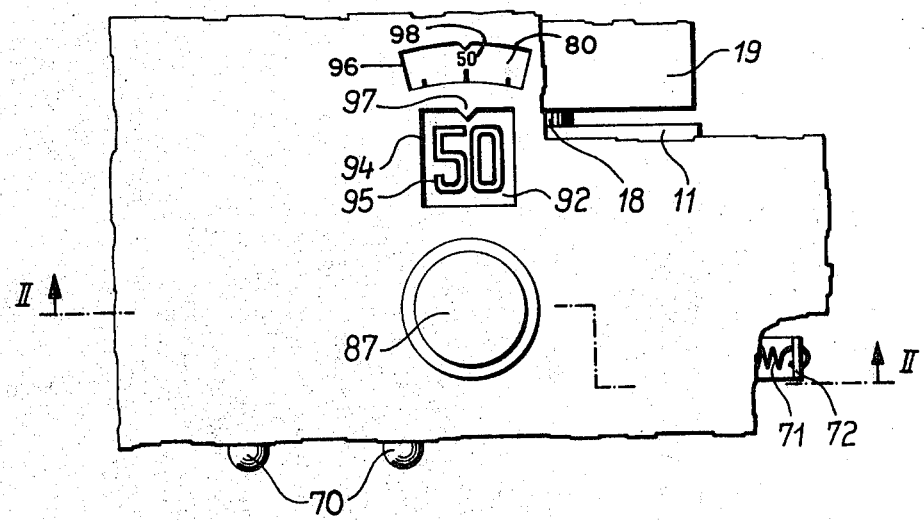

The present invention relates to drive means for tuners, in particular tuners for television sets, comprising a drum supported in a housing in a manner permitting it to be rotated about its longitudinal center line, said drum being provided with a plurality of positioning elements spaced along its circumference and arranged in a manner enabling them to be adjusted in the longitudinal direction of the drum, said positioning elements being selectively brought into engagement, by rotating the drum, with a scanning member operatively connected to tuning elements of the tuner, and control cams ensuring transition of the scanning member from one positioning element to another when the drum is rotated.

In an arrangement known from German application document 1,246,058 laid open to public inspection, the positioning elements take the form of rods supported in the housing in a manner enabling them to be displaced within the drum in a direction parallel to the axle of the drum and the ends of which are scanned by a pin disposed radially with respect to the drum, said pin being secured to a lever pivoting about an axle disposed parallel to said pin. Control cams for lifting the pin off the rod ends when the drum is rotated are provided in the form of a sleeve extending the drum, said sleeve featuring a saw-tooth-shaped end face. This known arrangement has the disadvantage of a very great overall length, because in their extreme front and rear positions the rods must project from the drum by at least the amount of their displacement. It is a further disadvantage of this arrangement that owing to the saw-tooth-shaped design of the sleeve the drum can be rotated in one direction only so that special pawls are required, and it is also a disadvantage that after passing over the tip of a saw tooth the pin on the lever drops with a thump onto the end of the tuning rod, which results in very high impact loads and adversely affects the accuracy of repetition. Finally, the costs involved in providing the known arrangement with scales indicating the tuning in the various selected channels are considerable.

In a further arrangement, known from U.S. Pat. 2,983,885, tuning spindles with running nuts as positioning elements are supported in a drum-type housing parallel to the center line of said housing. These running nuts serve as stops for a tuning body disposed in a manner enabling it to be displaced along the axle of the housing and having secured to it plungers for tuning coils. This slidably disposed body is provided with a rotatable stop which may be selectively brought into engagement with one of the positioning elements to fix the position of the slidable body and thus the desired tuning. Again, every adjustment of the rotatable stop requires a displacement of the slidably disposed body on the axle of the housing to a point where its stop will be located with certainty forward of a positioning element in its extreme front position. This is accomplished by means of a rotatable sleeve provided with a toothed end face of the type described above in connection with the preceding example. The teeth on the end face of the known drive means may, however, be of symmetrical shape, enabling the stop to be rotated in either direction.

This known arrangement is specifically adapted to the requirements of inductive tuning with the aid of plungers and not necessarily also suitable for driving the variable capacitor of a tuner, for example. The transmissions required for this application would mean a considerable further complication of this already expensive arrangement. The overall length of the housing is still comparatively great, because the slidably disposed body must be guided on a considerable length which must be added to the length required for displacing the body so that in this case the overall length may be assumed as amounting to not less than twice the length of displacement.

Finally, the French Pat. 1,454,107 discloses drive means for tuners in which the positioning elements again take the form of running nuts disposed on tuning spindles supported in a drum, although this time the tuning spindles extend in a radial direction with respect to the drum. This results in a very large diameter of the drum which necessarily amounts to considerably more than twice the length available for adjustment. Scanning is by means of a lever pivoting about an axle disposed in parallel relation to the drum axle and provided with a scanning projection which moves on a radial path with respect to the drum and thus may contact the running nut of a correspondingly directed tuning spindle. Said projection forms the apex of an essentially V-shaped cam capable of bridging the gap between two successive positioning elements when the drum is rotated so that one positioning element may slip off the apex of the cam and the next positioning element slide up along the cam and onto the apex while swivelling the lever as the drum rotates. This known arrangement has again the disadvantage that owing to the large diameter of the drum the space requirements are considerable, that on account of the unfavorable position of the axle miter gears are required either between a selector axle and the drum or between the scanning lever and the tuner drive and that it is difficult to produce an indication of the tuning selected in each channel.

In view of the trend towards ever smaller and lighter tele-communication equipment and, in particular, television sets and the aim of accommodating, as far as possible, all functional components of television sets, for example, within the cuboid defined by the picture tube, a drive for tuners requiring very little space while permitting the storage of a plurality of stations is of particular importance. Being mass-produced articles, such drives should additionally be characterized by great simplicity without sacrificing dependability. It is the objective of the present invention to provide a drive for tuners which largely meets these requirements.

According to the present invention, this objective is achieved by an arrangement in which the positioning elements take the form of running nuts disposed on tuning spindles supported in the drum parallel to the center line of the drum in a manner precluding displacement, said running nuts being provided with lugs projecting from the drum in a radial direction, and in which the scanning member takes the form of a spring-loaded lever pivoting about an axle disposed parallel to a tangent drawn to the drum such that the end of said lever may be moved along a tuning spindle facing said lever and bears against the lug of the running nut disposed on said tuning spindle under the force exerted by the spring, said lever being furthermore provided with a cam disposed within the path of the running nuts and extending essentially parallel to at least one curve connecting opposite ends of two adjacent tuning spindles.

In the arrangement according to the present invention, the length of the drum need not exceed the way of the positioning elements by more than a small amount and the diameter of the drum may also be kept comparatively small, which considerably reduces the space requirements of the drive means according to this invention. Furthermore, the parallel arrangement of drum axle and tuning spindles permits the use of very simple drives. In addition, disposing the pivot axle of the scanning lever at a right angle to the drum axle provides for a favorable orientation of the tuner without using complicated intermediate gears which would adversely affect the accuracy of repetition.

In a preferred embodiment of the invention, the lever is provided with two opposite control cams which together form an approximately V-shaped body, the apex of which contacts the running nut and the end face of which extends approximately parallel to the lateral area of the drum. This design of the lever enables the drum to be rotated in either direction and simultaneously ensures an essentially shockless transition of the scanning lever from one positioning element to another. A particularly simple design of the lever is obtained by forming the V-shaped body from a sheet-metal strip with one of the V-profile edges facing the drum and the other being secured to a supporting block.

It is a further special advantage of the drive means according to this invention that it permits a scale to be fitted in a very simple fashion. For example, one embodiment of the invention provides for a scale tape to be connected to the lever. Such a scale tape may either be a directly lettered tape moving past a window or else a tape driving a dial or drum, in which case a cord may be substituted for the tape. In a preferred embodiment of the invention, one end of the scale tape is connected to an arc-shaped surface concentric with the pivot axle of the lever of an arm of the lever pointing away from the drum while the other end of the tape is provided with a helical tension spring which simultaneouly constitutes the spring loading the lever. In this arrangement, the scale tape is wrapped around the hub of a scale dial supported on the outer wall of the housing of the drive in a manner enabling it to be rotated about an axle disposed parallel to the axle of the drum and is passed over a deflection pulley located near a slot in the wall of the housing. It is obvious that such an embodiment of the invention is very simple and that the additional space required to accommodate the scale arrangement is negligible.

Taking advantage of the above-mentioned orientation of the scanning lever pivot axle perpendicular to the axle of the drum, one embodiment of the invention provides for the lever to be secured directly on the rotor axle of the variable capacitors of the associated tuner, said capacitors having a tuning angle of approximately 60 degrees so that with a 60 degree angle of rotation proposed for the scanning lever the tuner may be operated through its full range.

To ensure accurately defined seating of the lever against the running nuts in any position of the running nuts and the lever, one embodiment of the invention provides for the lugs on the running nuts to be equipped with spherical ends and for the lever end scanning the running nuts to bear against the spherical surface of the corresponding lug at all times. This ensures that the accuracy of repetition cannot be affected by any more or lens undefined inclined positions.

The drum of the tuner according to the present invention may simply consist of a cylindrical body mounted on a shaft, said cylindrical body being provided with one flange each at either end for supporting the tuning spindles and with longitudinal slots disposed parallel to the tuning spindles, said longitudinal slots being engaged by projections of the running nuts. A cylindrical body of this type is easy to produce, e.g. by an injection molding or casting process, and affords good guidance for the running nuts. For example, the cylindrical body and one of the flanges may consist of a single plastic component pressed onto the shaft, while the other flange is preferably made of metal to provide a sufficiently rigid reference part with respect to which the tuning spindles may be supported longitudinally without play by clamping them in a suitable manner. To provide for such support without play, each tuning spindle may bear against the metallic flange with a shoulder, a washer being fitted if necessary, and may be retained on the outer side of the flange by means of a lock washer curved like a Belleville spring which engages a groove in the journal of the tuning spindle projecting through the flange. To avoid forces opposing the clamping forces, which might produce play and undesired errors in channel tuning as a result of such play, it is advisable to position the metallic flange so that the clamping elements of the tuning spindle act in the same direction as the load applied to the running nuts by the tuning member. Play of the running nuts on the spindles is eliminated by the load applied by the scanning lever itself since the forces acting on the lug of the running nut cause the nut to be canted on the tuning spindle thus eliminating any play.

According to a further feature of the invention, the tuning spindles may project from the drum with one of their ends, preferably the non-clamped end, and at that end be provided with a driving gear, preferably a crown gear, for adjustment of the positioning elements. The driving gear of the tuning spindle in the operative position may then be engaged by the driving gear on a tuning shaft supported in a manner permitting it to be displaced in parallel relation to the tuning spindle. An advantageous arrangement is one in which this tuning shaft is slidably supported in a bushing secured to the housing, said bushing also supporting the scale dial. The tuning shaft may be provided with a second driving gear engaging a driving gear fastened on the axle of the drum, preferably a spur gear, when the tuning shaft is not operatively connected to a tuning spindle. By axially displacing the tuning shaft, the drum may then either be rotated in steps for channel selection or, alternatively, the selected setting may be changed while the drum is in a predetermined position, either operation being effected by turning a knob on the tuning shaft. To produce an indication of the drum position, a further driving gear engaging the driving gear of a second scale dial indicating the position of the drum may be mounted outside the housing, said second scale dial being supported on the same axle as the first scale dial indicating the selected tuning. It is then possible to provide the last-mentioned scale with markings indicating the position of the drum, e.g. by consecutive numbers, and to fit a window above the marking indicating the scale position, the number appearing in the window indicating the tuning corresponding to that particular drum position on the first scale dial. These scale dials are fitted at the front of the housing accommodating the drum and the scanning lever and thus require no additional space. The space required to accommodate the transmissions needed to drive the scale dials is negligible as these transmissions are extremely simple.

To facilitate installation of the drum, the axle of the drum is placed in cut-outs in the housing and retained in these cut-outs by means of retaining springs. This measure enables the drum to be completely assembled outside the housing and then to be inserted as a complete unit into the cut-outs which are open towards the edge of the housing. This arrangement affords the additional special advantage of enabling the drum axle to be supported without play inasmuch as the cut-outs in the housing are provided with V-shaped ends disposed at right angles to each other so that the ends of the drum axle may be applied against the seats formed by the surfaces of the V under the force exerted by the retaining springs. In this manner, any radial play can be eliminated. To eliminate the axial play, an end face of the drum axle may, again, bear against the inner side of the wall of the housing at one end while the associated retaining spring at the end of the drum axle projecting from the housing fits behind a conical surface so that the drum axle is clamped against this wall of the housing and thus supported without play in the axial direction. Again, the clamping arrangement of the drum axle may be such as to act in the same direction as the load applied to the running nuts by the scanning member so that the elimination of play achieved by clamping the drum axle in the manner described is not adversely affected by the load applied by the scanning member.

Figure 2:
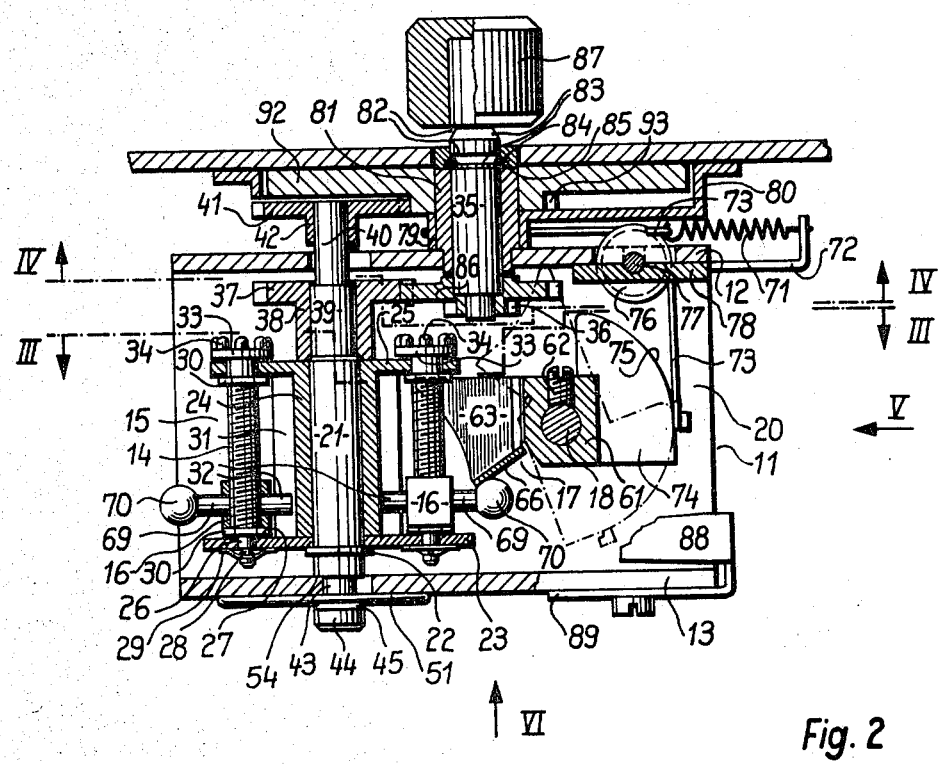
Figure 3:
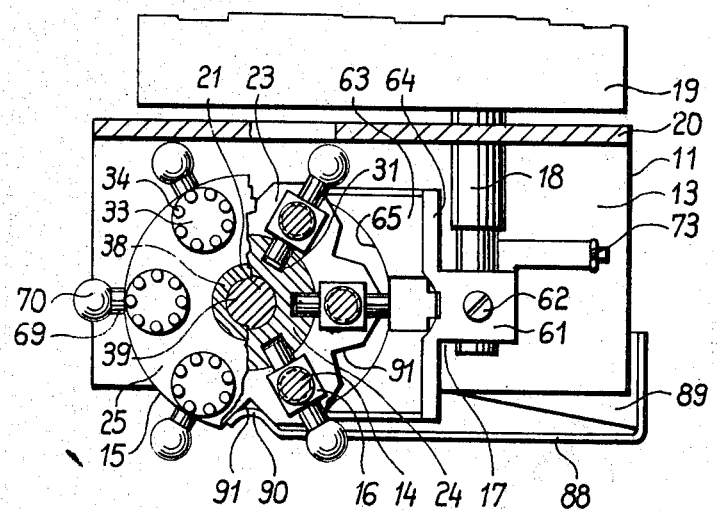
Figure 4:
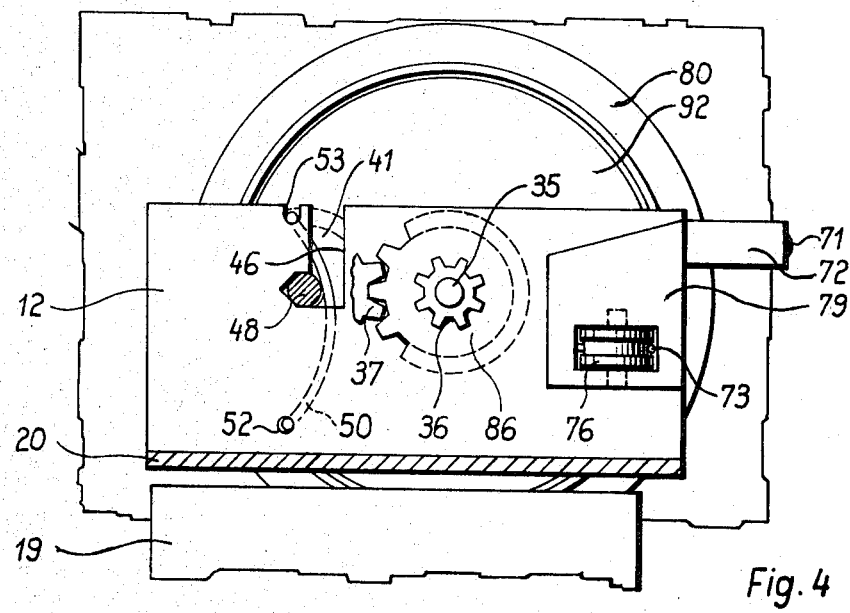
Figure 5:
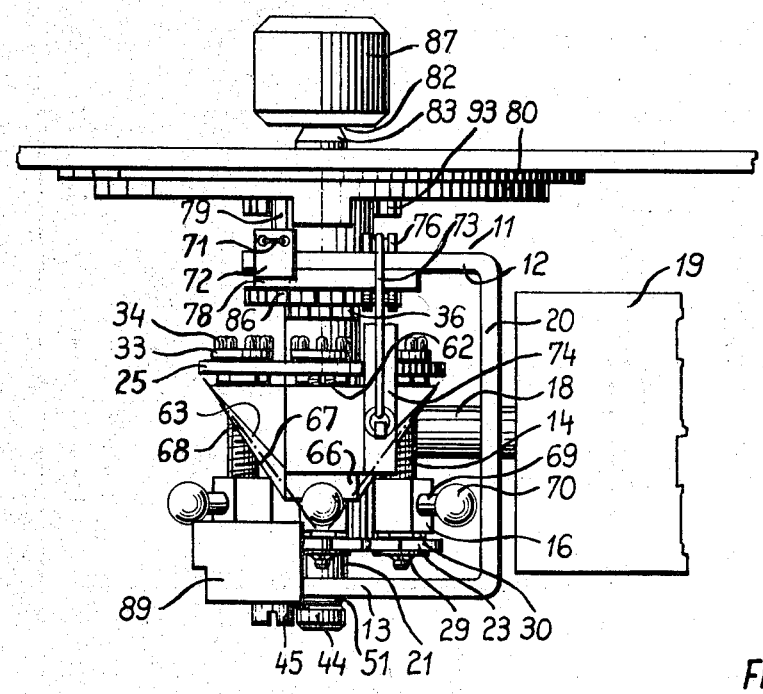
Figure 6:
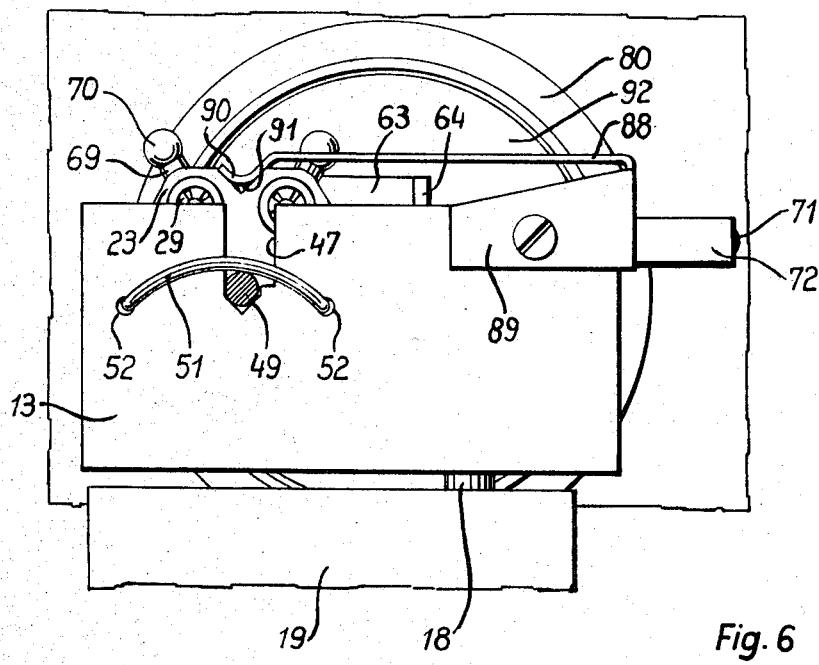

Further details and features of the invention will become apparent from the following specification, in which the invention is described and explained in detail, reference being made to the embodiment shown by way of example in the accompanying drawing. In other embodiments of the invention, the features apparent from the specification and the drawing may be applied either individually or in any desired combination of a plurality of such features. In the accompanying drawing:

FIG. 1 is a top plan view of a drive unit according to the invention,

FIG. 2 is a section through the arrangement according to FIG. 1, taken along the line III—III in FIG. 2, FIG. 3 is a section through the arrangement according to FIG. 1, taken along the line III—II in FIG. 2, FIG. 4 is a section through the arrangement according to FIG. 1, taken along the line IV—IV in FIG. 2, FIG. 5 is a view of the arrangement according to FIG. 1 in the direction indicated by the arrow V in FIG. 2, and FIG. 6 is a further view of the arrangement according to FIG. 1 in the direction indicated by the arrow VI in FIG. 2.

The drive unit according to the present invention as shown in the accompanying drawing features a housing 11 with a channel-type cross-section, a drum 15 provided with tuning spindles 14 being rotatably supported in the legs 12 and 13 forming the lateral walls of said housing. Running nuts 16 serving as positioning elements for a scanning lever 17 mounted on the shaft 18 supporting the rotors of a tuner, the housing 19 of which is connected to the bottom 20 of the housing 11 in a manner not shown in detail, are disposed on the tuning spindles 14 of the drum 15.

The drum 15 is disposed on an axle 21 consisting of metal, preferably steel, with a collar 22 near one of its ends which may be formed by a disc with a brazed connection to said axle, for example. This collar is followed by a plate 23 also made of metal, preferably steel, which is pressed against the collar 22 by a cylindrical plastic body 24. The plastic body 24 is pressed onto the axle 21 and provided with a flange 25 of approximately the same diameter as the disc 23 at its far end as referred to said disc 23. The tuning spindles 14 are inserted in corresponding bores of the disc 23 and the flange 25 and supported without play in the axial direction. This is accomplished by providing the tuning spindle 14 with a journal 26 with a diameter smaller than that of the tuning spindle and having this journal project through the steel disc 23 so that a shoulder 27 of the tuning spindle will bear against the inner surface of the disc 23. The end of the journal 26 is provided with an annular groove 28 engaged by a lock washer 29 curved like a Belleville spring, said lock washer 29 applying an axial load to the tuning spindle 14 and ensuring that the shoulder 27 of the tuning spindle will bear against the inner side of the disc 23 at all times. Since the disc 23 is made of metal and thus constitutes an essentially rigid component, the axial position of the tuning spindle 14 is accurately defined.

That section of the tuning spindles 14 which lies between the discs 23 and 25 is provided with a screw thread receiving the running nuts 16. The displacement of the running nuts 16 along the screw spindles 14 is limited by lock washers 30. To prevent the running nuts 16 from rotating on the tuning spindles, the cylindrical basic body 24 of the drum is provided with longitudinal slots 31 engaged by pin-type radial projections 32 of the running nuts 16 so that the running nuts 16 are prevented from rotating with respect to the drum and thus also with respect to the tuning spindles 14 and, as a result, may be moved in a direction parallel to the axle of the drum by rotating the tuning spindles. To enable the tuning spindles 14 to be rotated, their ends projecting from the flange 25 of the cylindrical body 24 are provided with driving gears 33 which are designed in the fashion of a crown gear and provided with driving pins 34 disposed perpendicularly to the end face of the gear. These crown-gear-type driving gears may be engaged by the driving gear 36 mounted at the end of a tuning shaft 35, as will be described later. The drum 15 is followed by a gear 37, the sleeve-type hub 38 of which is pressed onto a slightly thinner section 39 of the drum axle 21 adjacent to the drum 15. The gear 37 is followed by a journal 40 of the drum axle 21, onto the extreme end of which is pressed a second gear 41 which, including its hub 42, is located at a certain distance from the gear 37.

The other end of the drum axle 21, i.e. the end projecting beyond the collar 22, also continues in a journal 43 ending in a collar 44 provided with a conical surface 45 on its inner side.

To support the drum axle 21, the legs 12 and 13 forming the lateral walls of the housing 11 are provided with one slot 46 or 47 each, said slot ending in a V-shaped section 48 or 49 respectively. Both slots 46 and 47 are open towards the end of the leg 12 or 13 respectively so that the journals 40 and 43 of the axle 21 may be inserted into these slots from the edge of the lateral walls 12 and 13. Consequently, all parts of the drum 15 and the gears 37 and 41 may be mounted on the drum axle 21 before the drum is installed in the housing. While the slots 46 and 47 are parallel to each other, the V-shaped end sections 48 and 49 are disposed at right angles to each other. The journals of the drum axle 21 are forced against the surfaces of the V-shaped sections, which include an angle of 90 degrees, by one retaining spring each, 50 or 51 respectively, said retaining spring being formed by a prestressed spring wire inserted into corresponding bores or cut-outs 52 and 53 of the housing walls 12 and 13 respectively at its ends and spanning the open sides of the V-shaped sections 48 and 49. In this manner, the drum axle 21 is supported without any play in the radial direction. Simultaneously, the drum axle is also supported without any play in the axial direction. The annular groove 43 at one end of the drum axle 21 is so dimensioned that the end face 54 of the drum axle formed by the transition from the drum axle to the journal 43 bears against the inner side of the housing wall 13 while the retaining spring 51 bearing against the outer side of the housing wall 13 is seated on the conical surface 45 of the collar 44 and thus permanently forces the shoulder 54 of the drum axle 21 against the inner side of the housing wall 13. It should be noted that the clamping arrangement selected for eliminating the play of the drum axle 21 acts in the same direction as the clamping arrangements of the tuning spindles 14.

As already mentioned, the scanning lever 17, the position of which is determined by the positioning springs formed by the running nuts 16, is secured directly to the rotor shaft 18 of the variable capacitors of the tuner connected to the bottom 20 of the housing 11. For this purpose, the rotor shaft 18 of the tuner projects through a corresponding opening in the bottom 20 into the housing 11 and extends parallel to a tangent drawn to the drum 15. The scanning lever 17 disposed on the rotor shaft 18 consists of a central block 61 fixed on the rotor shaft 18 by means of a locking screw 62 and carrying a V-shaped body 63 at the side facing the drum 15. This V-shaped body consists of a sheet-metal strip. That edge of this strip which forms the V-profile and which faces the block 61 is secured to said block 61 and two arms 64 projecting from said block parallel to the rotor axle 18, e.g. by brazing. The edge 65 facing the drum 15 and forming the end face of the V-shaped body has a rounded shape and extends approximately parallel to the lateral area of the drum, looking in the axial direction of the drum 15, as clearly shown in FIG. 3. The apex 66 of the V-shaped body 63 forms that arm of the lever 17 which bears against the positioning element 16, while the lateral surfaces 67 form cam portions having edges 65 extending essentially parallel to curves 68 connecting opposite ends of two adjacent tuning spindles 14, as shown in FIG. 5. To provide for an accurately defined seat of the scanning lever 17 on the positioning elements 16 at all times, the running nuts 16 forming the positioning elements are provided with lugs 69 ending in balls 70. Consequently, the apex 66 of the V-shaped body 63 of the scanning lever 17 will always contact the spherical end 70 of the positioning element 16 in a tangential plane and thus be accurately defined in its position with respect to said spherical end. Scanning errors are thus avoided so that the attainable accuracy of repetition is very high.

A helical tension spring 71 is employed to apply the lever 17 against the positioning element 16 for the adjacent tuning spindle 14. This spring is hooked to a bow 72 fastened on the upper housing wall 12 according to FIG. 2 and connected to one end of a pull tape 73, the other end of which is connected to a second arm 74 of the scanning lever 17 disposed on the side of the block 61 facing away from the V-shaped body 63. The arm 74 has an arc-shaped outer surface 75 which is concentric with the rotor shaft 18 and on which the tape 73 may be wound and unwound in a manner keeping it always tangential to a deflection pulley 76. The axle 77 of said pulley 76 is loosely positioned in corresponding slots of the housing wall 12 and retained only by the pressure of the tape 73 on the one hand and of a plate 78 secured to the inner side of the housing wall 12 on the other hand. In the embodiment of the invention shown by way of example, the bow 72 is formed by a projection of the plate 78. At the pulley 76, the pull tape 73 penetrates the housing wall 12 and, on the outside of the housing wall 12, passes around the hub 79 of a scale dial 80 rotatably supported at the outside of the housing wall 12 on a bearing bush 81 fastened in the wall of the housing. Consequently, the pull tape 73 simultaneously drives the scale dial 80 and transforms the angular position of the scanning lever 17 into an angular position of the scale dial so that the scale dial always indicates the precise setting of the bent lever 17 and thus the precise tuning.

The tuning shaft 35 already mentioned above serves to adjust the position of the drum 15 and to change the tuning in any position of the drum. This tuning shaft is supported in a manner permitting it to be rotated in the bearing bush 81 secured to the housing wall 12 and to be displaced in its longitudinal direction. Two annular grooves 82 serve to lock the tuning shaft in two positions. The flanks 83 of these grooves facing each other form conical surfaces. Depending on the position of the tuning shaft 35, one of the two annular grooves will be located at a lock washer 84 inserted in a corresponding annular groove 85 within the bearing bush 81.

The end of the tuning shaft 35 located inside the housing 11 mounts the gear 36, which is capable of engaging the crown gear 33 at the end of the tuning spindle 14 in the operative position, and a further gear 86 engaging the gear 37 on the drum axle 21 when the tuning shaft 35 is locked in the position shown in FIG. 2. It follows that in this position of the tuning shaft 35 the drum may be rotated by turning the tuning shaft with the aid of the tuning knob 87 mounted on the extreme end of the tuning shaft. To lock the drum 15 in any of the positions in which one of the tuning spindles 14 is located opposite the scanning lever 17, a locking spring 88 is provided which is formed by a leaf spring secured to the edge of the lower housing wall 13 according to FIG. 2 with a bent-off arm 89. The curved end 90 of said leaf spring 88 engages locking notches 91 spaced along the circumference of the metallic drum disc 23. With the aid of the gear 41 disposed on the drum axle 21 outside the housing 11, the position of the drum is transmitted to a further scale dial 92 disposed forward of the scale dial 80 on the bearing bush 81 and provided with a pinion 93 on the side facing the housing 11, said pinion 93 being engaged by the gear 41 mounted on the drum axle 21. Where the gear 41 of the drum axle 21 is in mesh with the pinion 93 of the scale dial 92 for the drum position, the scale dial 80 is provided with a cut-out so that the scale dials 80 and 92 and their respective drives will not interfere with each other.

As shown in FIG. 1, a front panel hiding the scale dials 80 and 92 may be provided with both a window 94 for markings 95 of the scale dial 92 indicating the position of the drum and a window 96 displaying, in front of a reference mark 97, the markings 98 provided on the outer scale dial 80 for the setting of the tuner corresponding to the indicated position of the drum. This setting may be changed in any position of the drum by pushing the tuning shaft 35 into the second locking position. This will disengage the gear 86 of the tuning shaft 35 from the gear 37 on the drum axle 21 and, instead, engage the spur gear 36 of the tuning shaft with the crown gear 33 at the end of the tuning spindle which is in the operative position so that when the knob 87 of the tuning shaft 35 is turned the corresponding tuning spindle 14 will now be rotated via the meshing gears 36 and 34 and the running nut 16 be displaced along said tuning spindle. After the desired setting has bee neffected, the tuning shaft 35 may be retracted to its initial position, after which another preset channel may be selected and the tuning of this channel be corrected, if necessary, in the manner described above. As the drum 15 is rotated, the ball 70 of the positioning element 16 of that tuning spindle 14 which was in the operative position before the drum started to move will slip off the apex 66 of the V-shaped body 63 and slide along one of the two flanks 67. This will cause the scanning lever 17 to be rotated counterclockwise according to FIG. 2 in response to the force of the helical tension spring 74 transmitted by the pull tape 73 until the ball of the positioning element of the tuning spindle which is next to move into the operative position is engaged by the opposite flank of the V-shaped body 63, rotating the scanning lever 17 clockwise according to FIG. 2 against the force of the spring 71 until the apex 66 of the V-shaped body 63 rests on the ball 70 of the positioning element 16 of the tuning spindle which is now in the operative position.

It should also be noted that the tuner according to the present invention provides for a very high repetitive accuracy when the same channel is selected repeatedly. This is explained by the fact that play has been eliminated by the manner in which the drum 15 is supported in the housing 11 and the tuning spindle 14 in the drum 15 and that, in addition, the running nuts 16 disposed on the tuning spindles 14 always assume a precisely defined position on the tuning spindles under the load applied by the scanning lever 17. With this end in view, it is a special advantage that the force exerted by the helical tension spring 71 and applied to the running nuts 16 on the tuning spindles 14 by the pull tape 73 and the lever 17 unilaterally acts on the lugs 69 with the balls 70, causing the running nuts to be canted. It should also be noted that this force acts in the same direction as the clamping arrangements of the tuning spindles 14 and the drum axle 21 so that all these forces assist rather than oppose each other in eliminating play.

It shall be understood that the present invention is not restricted to the embodiment shown by way of example and that deviations from this embodiments are possible without exceeding the scope of the invention. In particular, the invention does not depend on the specific design of the drum and the scanning lever, the methods of fitting the scale dials and locking the drum, although, on account of its simple design and compact arrangement, the embodiment shown by way of example is a particularly favourable one also in this respect.

Having thus fully described our invention, what we claim as new and wish to secure by Letters Patent is:

1. Drive means for tuners, in particular tuners for television sets, comprising a drum supported in a housing in a manner permitting it to be rotated about its longitudinal center line, said drum being provided with a plurality of positioning elements spaced along its circumference and arranged in a manner enabling them to be adjusted in the longitudinal direction of the drum, said positioning elements being selectively brought into engagement, by rotating the drum, with a scanning member operatively connected to tuning elements of the tuner, said scanning member having control cams ensuring transition of the scanning member from one positioning element to another when the drum is rotated, characterized in that said positioning elements take the form of running nuts disposed on tuning spindles supported in the drum parallel to its longitudinal center line in a manner preventing displacement, said running nuts being provided with lugs projecting from said drum in a radial direction, and in that said scanning member takes the form of a level loaded by a spring means and pivoting with an axle disposed parallel to a tangent drawn to said drum such that the end of said lever may be moved toward a tuning spindle facing said lever and be applied against the lug of the running nut disposed on said tuning spindle by the force of said spring means, said lever being furthermore provided with a cam component disposed in the path of the running nuts and having at least one edge facing said drum extending essentially parallel to at least one curve connecting opposite ends of two adjacent tuning spindles.

2. Drive means according to claim 1, characterized in that said lever is provided with opposite control cams which together form an approximately V-shaped body, the apex of said body seating against the lug of said running nut, while the end face of said body extends approximately parallel to the lateral area of said drum.

3. Drive means according to claim 2, characterized in that said V-shaped body is formed by a sheet-metal strip, one of the V-profile edges of said sheet-metal strip facing said drum and the other being secured to a supporting block.

4. Drive means according to claim 1, characterized in that said lever is connected to one end of a scale tape, and the other end of said scale tape is connected to said spring said spring means including said tape and said spring.

5. Drive means according to claim 4, characterized in that one end of said scale tape is secured to an arc-shaped surface of an arm of said lever pointing away from said drum, said arc-shaped surface being concentric with the pivot axle of said lever, while its other end is connected to the spring constituting a helical tension spring.

6. Drive means according to claim 4, characterized in that said scale tape is wrapped around the hub of a scale dial supported on the outer wall of the housing of the drive, said scale dial being supported in a manner permitting it to be rotated about an axle disposed parallel to the drum axle, and in that said scale tape is passed over a deflection pulley disposed at a slot in the wall of said housing.

7. Drive means according to claim 6, characterized in that a tuning shaft is slidably supported in a bushing secured to said housing, said bushing simulateously serving as axle for said scale dial.

8. Drive means according to claim 1, characterized in that said scanning lever is mounted directly on a rotor shaft of variable capacitors of the associated tuner and in that the angle of rotation of said lever is approximately 60 degrees, said axle comprising said rotor shaft.

9. Drive means according to claim 1, characterized in that said lugs of said running nuts are provided with spherical ends and in that the end of said lever scanning said running nuts bears against the spherical surface of the corresponding lug at all times.

10. Drive means according to claim 1, characterized in that said drum consists of a cylindrical body mounted on an axle, at least one end of said body being provided with one flange for supporting said tuning spindles, said cylindrical body being furthermore provided with longitudinal slots disposed parallel to said tuning spindles, said longitudinal slots being engaged by projections of said running nuts.

11. Drive means according to claim 10, characterized in that said cylindrical body and one of said flanges consists of a single common plastic component pressed onto the drum axle, while the other flange is made of metal, and in that with reference to said metal flange, said tuning spindles are supported without play in their longitudinal direction by means of suitable clamping arrangements.

12. Drive means according to claim 11, characterized in that a shoulder on each of said tuning spindles bears against said metal flange and in that, on the outer side of said flange, said tuning spindles are retained by a lock washer curved in the fashion of a Belleville spring, said lock washer engaging a slot of the journal of said tuning spindles which projects through said flange.

13. Drive means according to claim 11, characterized in that said clamping arrangements of said tuning spindles act in the same direction as the load applied to said running nuts by said scanning lever.

14. Drive means according to claim 1, characterized in that one end of said tuning spindles projects from said drum and in that said end is provided with a driving gear, and in that said driving gear of the tuning spindle which is in the operative position may be engaged by a driving gear on a tuning shaft supported in a manner permitting it to be displaced parallel to said tuning spindle.

15. Drive means according to claim 14, characterized in that said tuning shaft carries a second driving gear engaging a driving gear, mounted on the drum axle in that position in which said tuning shaft is not operatively connected to said tuning spindle.

16. Drive means according to claim 15, characterized in that a further driving gear engaging a driving gear of a second scale dial indicating the position of the drum is mounted on the drum axle outside said housing, said scale dial being mounted on the same axle which also mounts the first scale dial indicating the setting of the tuning.

17. Drive means according to claim 1, characterized in that said drum axle is inserted in cut-outs of the housing and retained in said cut-outs of the housing by means of retaining springs.

18. Drive means according to claim 17, characterized in that said cut-outs of the housing are provided with V-shaped ends disposed at right angles to each other.

19. Drive means according to claim 17, characterized in that an end face at one end of said drum axle bears against the inner side of said wall of the housing and in that the associated retaining spring fits behind a conical surface at the end of said drum axle which projects from the housing so that said drum axle is clamped against said wall of the housing and thus supported in a manner eliminating any play.

20. Drive means according to claim 19, characterized in that said clamping arrangements of said drum axle act in the same direction as the load applied to said running nuts by said scanning lever.

References Cited

UNITED STATES PATENTS

| | | | |
|---|---|---|---|
| 2,934,964 | 5/1960 | Parsons | 74—10.15 |
| 3,415,127 | 12/1968 | Miner et al. | 74—10.6 |
| 3,474,362 | 10/1969 | Harten | 74—10.8X |

MILTON KAUFMAN, Primary Examiner

U.S. Cl. X.R.

74—10.54, 10.85